United States Patent [19]

Lotsch et al.

[11] 4,398,027

[45] * Aug. 9, 1983

[54] PREPARATION OF PIGMENTARY FORM ISOINDOLINE

[75] Inventors: Wolfgang Lotsch, Beindersheim; Peter Hilbert, Bobenheim, both of Fed. Rep. of Germany

[73] Assignee: BASF Aktiengesellschaft, Rheinland-Pfalz, Fed. Rep. of Germany

[*] Notice: The portion of the term of this patent subsequent to Jun. 2, 1998, has been disclaimed.

[21] Appl. No.: 193,017

[22] Filed: Oct. 2, 1980

Related U.S. Application Data

[63] Continuation of Ser. No. 1272, Jan. 5, 1979, Pat. No. 4,271,301.

[30] Foreign Application Priority Data

Jan. 10, 1978 [DE] Fed. Rep. of Germany ....... 2800815

[51] Int. Cl.$^3$ ............................................ C09B 57/04
[52] U.S. Cl. ...................... 544/296; 544/300
[58] Field of Search ................................ 544/296, 300

[56] References Cited

U.S. PATENT DOCUMENTS

| | | | |
|---|---|---|---|
| 3,991,054 | 11/1976 | Bock et al. ......................... | 544/300 |
| 4,013,481 | 3/1977 | Molls et al. ...................... | 106/288 Q |
| 4,127,420 | 11/1978 | Harris et al. .................... | 106/288 Q |
| 4,166,179 | 8/1979 | Lotsch ................................. | 544/296 |
| 4,271,301 | 6/1981 | Lotsch et al. ...................... | 544/296 |

*Primary Examiner*—Paul M. Coughlan, Jr.

*Attorney, Agent, or Firm*—Oblon, Fisher, Spivak, McClelland & Maier

[57] ABSTRACT

A process for converting finely particled agglomerated crude isoindoline pigments of the formula

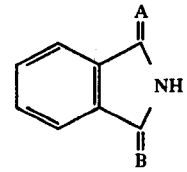

where A is

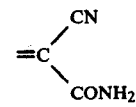

and B is the radical of an unsubstituted or substituted barbituric acid, or A and B are both such a barbituric acid radical, into tinctorially valuable pigmentary forms, wherein the crude pigment, which consists of primary particles having a mean size of $\leq 0.1$ μm, is subjected to shearing forces in water, and thereafter the aqueous suspension is heated at from 90° to 160° C. in the presence or absence of a surfactant and the pigment is isolated. Easily dispersible, low-hiding to extremely high-hiding pigments are obtained, which give brilliant colorations of improved lightfastness and fastness to weathering.

10 Claims, No Drawings

PREPARATION OF PIGMENTARY FORM ISOINDOLINE

This is a continuation of application Ser. No. 1272, filed Jan. 5, 1979, now U.S. Pat. No. 4,271,301.

The present invention relates to a process for converting an isoindoline pigment into an easily dispersible, brilliant, low-hiding to extremely high-hiding and weathering-fast pigmentary form.

Isoindoline pigments of the formula

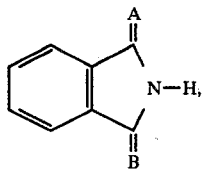

where A is

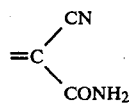

or is the radical of a barbituric acid and B is the radical of a barbituric acid (for example the compound described in British Pat. No. 1,187,667.

Example 76, and especially those in which both A and B are a barbituric acid radical, for example the compounds described in German Laid-Open Application DOS 2,041,999 are distinguished by good fastness characteristics. It is true that the pigments obtained by the methods of preparation described in the above publications are obtained in a finely particled form, but the pigments are agglomerated and harsh in texture so that the colorations obtained in surface coatings and plastics are specked, pale and dull and have low hiding power.

Using the customary methods of preparation of high-hiding organic pigments, such as heating the crude pigment in an organic solvent in the presence or absence of water (German Laid-Open Applications DOS 2,521,249, 2,302,508, 2,302,517, 2,302,482 and 2,521,249) or milling the pigment and then recrystallizing it from an organic solvent as described in German Laid-Open Application DOS 2,357,077, does not succeed, in the case of the above isoindoline compounds, in producing the desired pigmentary form.

It will be appreciated from the Examples which follow that the present invention provides a process in which the above isoindoline compounds can be converted into brilliant, easily dispersible and high-hiding pigmentary forms whilst retaining or improving the fastness characteristics.

According to the invention, there is provided a process for the preparation of a pigmentary form of an isoindoline pigment of the general formula:

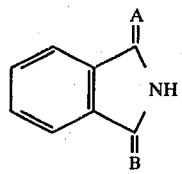

wherein A is

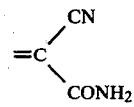

or is the radical of a barbituric acid and B is the radical of a barbituric acid, wherein the agglomerated crude pigment, in which the primary particles have a mean particle size of $\leq 0.1$ μm, is subjected to shearing forces in an aqueous medium, thereafter the resulting aqueous suspension is heated at from 90° to 160° C. in the presence or absence of a surfactant, and the pigment is isolated.

The barbituric acid radicals may, for example, be the radicals of N-methylbarbituric acid, N-phenylbarbituric acid, 2-thiobarbituric acid, 2-iminobarbituric acid, 2-N-cyanoiminobarbituric acid or unsubstituted barbituric acid. Of course, when two radicals of a barbituric acid are present they may be identical or different and naturally the starting pigment may comprise two isoindolines differing with respect to the identity of barbituric acid radicals in their molecules. The radical of unsubstituted barbituric acid is preferred.

Using the process of the invention, it is possible, simply and without employing an organic solvent (and thus avoiding the economic and ecological problems associated with the use of organic solvents), to obtain brilliant, easily dispersible and low-hiding to extremely high-hiding pigments having improved lightfastness and fastness to weathering.

The process according to the invention is in general carried out by subjecting the crude isoindoline pigment (which may, for example, have been prepared in accordance with German Laid-Open Application DOS 2,041,999 or British Pat. No. 1,187,667) to shearing forces in the presence of water at from 20° C. to 100° C.

In the methods of isoindoline preparation described in the cited literature, the crude pigments are obtained in a very finely particled form and can normally be subjected, as obtained, to the process according to the invention. However, where crude pigments with a mean primary particle size $>0.1$ μm are concerned, comminution to a mean primary particle size of $\leq 0.1$ μm, preferably having a very narrow particle size distribution, is necessary.

Particularly valuable products are obtained if, before carrying out the process according to the invention, the crude pigments are comminuted in the conventional manner by milling to a mean primary particle size of $\leq 0.02$ μm coupled with a very narrow particle size distribution.

The shearing forces in the aqueous suspension are generated, for example, in comminuting equipment employing an agitated grinding medium such as glass, metal, ceramic or plastics balls, or sand. Examples of such comminuting equipment are a sand mill, a bead mill, and a stirred ball mill. The required shearing forces may also be applied using a kneader.

The amount of the grinding medium when used is in general from 10 to 40 times the amount by weight of the pigment.

As mentioned earlier, the shear is normally carried out at from 20° C. to 100° C., but preferably it is effected at from 40° to 80° C.

The aqueous pigment suspension produced by the shearing is heated (in the presence of the grinding medium or after removal thereof) either directly or after addition of a surfactant, at from 90° C. to 160° C., and can then be worked up in a conventional manner.

The amount of surfactant when used is not critical and can be varied within wide limits. Thus, even less than 1%, based on pigment, suffices to ensure good wetting of the pigment whilst it is being heated. Usually, however, when used the surfactant will be used in an amount of from 1% to 100%, based on pigment.

The surfactant may, for example, be a nonionic, anionic or cationic compound conventionally used as a dispersant, wetting agent and/or protective colloid. Examples of anionic surfactants are alkali metal salts or alkaline earth metal salts or ammonium salts of $C_4$-$C_{20}$-alkylbenzenesulfonic acids, $C_4$-$C_{20}$-alkylphenolsulfonic acids, mono- and bis-$C_1$-$C_{10}$-alkylnaphthalenesulfonic acids, partially sulfonated polystyrene, water-soluble condensation products of $\beta$-naphthalenesulfonic acid and/or $C_1$-$C_{10}$-alkylnaphthalene-$\beta$-sulfonic acids with formaldehyde, condensation products of phenolsulfonic acids, formaldehyde and urea, condensation products of phenol, urea and sodium sulfite, phenol-formaldehyde condensation products which have been post-condensed with phenolsulfonic acid, urea and formaldehyde, ligninsulfonic acids, long-chain $C_1$-$C_{20}$-fatty acids and rosin acids.

Examples of nonionic surfactants are adducts of ethylene oxide, propylene oxide or ethylene oxide and propylene oxide with $C_8$-$C_{20}$-alkanols, $C_2$-$C_{10}$-alkanediols, $C_3$-$C_{10}$-alkanepolyols, phenols, $C_6$-$C_{18}$-alkylphenols, $C_8$-$C_{20}$-carboxylic acids, $C_8$-$C_{20}$-carboxylic acid amides and aliphatic, cycloaliphatic or benzene-aromatic monoamines, diamines and polyamines.

Further examples of the surfactants are water-swellable and water-soluble polymers, for example copolymers of vinylpyridine, N-vinylpyrrolidine, acrylamide and/or acrylic acid with one or more water-insoluble monomers, eg. acrylonitrile, methacrylic acid esters, acrylic acid esters, vinyl acetate, vinyl chloride and/or styrene, as well as polyvinyl alcohol, and $C_{10}$-$C_{20}$-fatty alcohols.

The surfactant can, of course, be used in the form of a mixture.

Preferred surfactants are alkali metal or ammonium salts of $C_1$-$C_5$-alkylnaphthalenesulfonic acids, condensation products of phenol, urea and formaldehyde, adducts of ethylene oxide, propylene oxide and/or ethylene oxide and propylene oxide with $C_2$-$C_{20}$-alkanols, $C_2$-$C_{10}$-alkanediols, $C_3$-$C_{10}$-alkanetriols, aliphatic $C_{10}$-$C_{20}$-carboxylic acids and their amides and $C_{10}$-$C_{20}$-fatty alcohols, and mixtures of these.

By appropriate selection of the conditions for heating the aqueous suspension, after it has been subjected to shearing forces, it is possible to produce, in a controlled manner, high-hiding and very high-hiding pigments having very good tinctorial and technological properties.

If, after milling, the suspension is boiled for from one to ten hours, brilliant, deep and low-hiding pigments are obtained.

If the same suspension is refluxed for from 10 to 30 hours, especially from 15 to 30 hours, brilliant more highly hiding pigments having improved lightfastness and fastness to weathering are obtained.

If, after milling, the suspension is heated for from 3 to 20 hours at from 110° to 140° C. under pressure, the pigments obtained are extremely high-hiding compared to conventional organic yellow pigments and have excellent lightfastness and fastness to weathering.

The Examples which follow illustrate the process according to the invention. Parts and percentages in the Examples are by weight.

EXAMPLE 1

30 parts of the colorant described in Example 1 of German Laid-Open Application DOS 2,041,999 are milled for 8 hours in a planetary ball mill (filled with 150 parts of agate balls of diameter from 0.5 to 1.5 cm), the resulting primary particle size being $\leq 0.05$ $\mu$m. The greatly densified, brownish yellow powder is stirred with 180 parts of plastic beads of diameter from 0.5 to 1 mm and 240 parts of water for 5 hours at from 60° to 70° C., using a high-speed stirrer. The beads are then sieved off and washed with a further 200 parts of water to remove adhering colorant.

0.5 part of the sodium salt of a $C_1$-$C_5$-alkylnaphthalenesulfonic acid is added to the resulting suspension, which is then heated for 7 hours at 130° C. After filtration and drying, 25 parts of a brilliant, easily dispersible and high-hiding very reddish yellow pigment having excellent lightfastness and fastness to weathering are obtained.

EXAMPLE 2

The procedure described in Example 1 is followed, except that the pigment suspension is heated for 14 hours at 100° C. 26 parts of a reddish, deep and easily dispersible yellow pigment of medium hiding power, significantly improved fastness to weathering and great brilliance in pure shades are obtained.

EXAMPLE 3

The procedure described in Example 1 is followed, except that the pigment suspension is heated for 6 hours at 100° C. 27 parts of a very deep, brilliant pigment are obtained; this product is significantly superior, in hiding power and dispersibility, to the pigment obtainable according to Example 1 of German Laid-Open Application DOS 2,041,999.

EXAMPLE 4

The procedure described in Example 1 is followed, but a crude pigment prepared as described in Example 1 of German Laid-Open Application DOS 2,041,999 is used for milling in water. 24 parts of a brilliant, easily dispersible and high-hiding very reddish yellow pigment having excellent lightfastness and fastness to weathering are obtained.

A yellow pigment with the same properties is obtained if the crude pigment used is that obtained according to Example 2 or Example 3 of German Laid-Open Application DOS 2,041,999.

EXAMPLE 5

The procedure described in Example 1 is followed, except that 30 parts of the pigment prepared as described in Example 76 of British Pat. No. 1,187,667 are used. 24 parts of a brilliant, high-hiding and easily dispersible greenish pigment are obtained, the pigment being fast to weathering in colorations near the pure shade.

We claim:

1. A process for the preparation of a brilliant, easily dispersible and low-hiding to extremely high-hiding pigmentary form of an isoindoline pigment of the formula

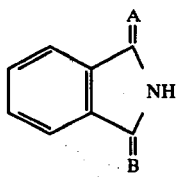

wherein A is

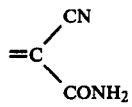

or is a substituted or unsubstituted barbituric acid radical, and B is a substituted or unsubstituted barbituric acid radical, which comprises
  subjecting a suspension which consist essentially of the agglomerated crude pigment, in which the primary particles have a mean particle size of $\leq 0.1$ $\mu$m to shearing forces in water in the presence of grinding media or in a kneader,
  thereafter heating the resulting aqueous suspension at from 90 to 160 C in the presence or absence of a surfactant, for 1–30 hours and isolating the resulting pigment.

2. A process as claimed in claim 1, wherein an agglomerated crude pigment in which the primary particles have a mean particle size of $\leq 0.02$ $\mu$m, is employed.

3. A process as claimed in claim 1 or 2, wherein the shearing forces are generated in the aqueous suspension of the fine-particled agglomerated crude pigment by means of agitated milling bodies.

4. A process as claimed in claim 1 or 2, wherein a crude pigment is used in which A is

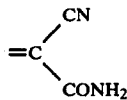

and B is a radical of unsubstituted barbituric acid, of N-phenylbarbituric acid, of 2-thiobarbituric acid, of 2-iminobarbituric acid or of 2-N-cyanoiminobarbituric acid, or A and B are each one of the radicals mentioned in the definition of B.

5. A process as claimed in claim 1 or 2, wherein A and B are each a radical of unsubstituted barbituric acid or A is

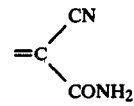

and B is the radical of unsubstituted barbituric acid.

6. A process as claimed in claim 1 or 2, wherein the aqueous suspension is heated in the presence of an adduct of ethylene oxide, propylene oxide or propylene oxide and ethylene oxide with a $C_8$–$C_{20}$-alkanol, $C_2$–$C_{10}$-alkanediol, $C_3$–$C_{10}$-alkanepolyol, phenol, $C_6$–$C_{18}$-alkylphenol, $C_8$–$C_{20}$-carboxylic acid, $C_8$–$C_{20}$-carboxylic acid amide or aliphatic, cycloaliphatic or benzene-aromatic monoamine, diamine or polyamine.

7. A process as claimed in claim 1 or 2, wherein the aqueous suspension is heated in the presence of an alkali metal salt or ammonium salt of a $C_4$–$C_{20}$-alkylbenzenesulfonic acid, $C_4$–$C_{20}$-alkylphenolsulfonic acid, mono- or bis-$C_1$–$C_{10}$-alkylnaphthalenesulfonic acid, partially sulfonated polystyrene, water-soluble condensation product of $\beta$-naphthalenesulfonic acid or of a $C_1$–$C_{10}$-alkylnaphthalene-$\beta$-sulfonic acid, or of a mixture of these, with formaldehyde, condensation product of a phenolsulfonic acid, formaldehyde and urea, ligninsulfonic acid or $C_7$–$C_{20}$-rosin acid.

8. A process as claimed in claim 4, wherein the aqueous suspension is heated in the presence of an alkali metal or ammonium salt of a $C_1$–$C_5$-alkylnaphthalenesulfonic acid, a condensation product of phenol, urea and formaldehyde, an adduct of ethylene oxide, propylene oxide or propylene oxide and ethylene oxide with a $C_2$–$C_{20}$-alkanol, $C_3$–$C_{10}$-alkanediol, aliphatic $C_1$–$C_{20}$-carboxylic acid or aliphatic $C_1$–$C_{20}$-carboxylic acid amide, $C_{10}$–$C_{20}$-fatty alcohol or a mixture of the said agents as the surfactant.

9. A process as claimed in claim 8, wherein the amount of surfactant, based on crude pigment, is from 1 to 100% by weight.

10. The process of claim 1, wherein said heating is carried out for 1–10 hours.

* * * * *

UNITED STATES PATENT AND TRADEMARK OFFICE
CERTIFICATE OF CORRECTION

PATENT NO. : 4,399,027

DATED : August 16, 1983

INVENTOR(S) : Jan D. Miller

It is certified that error appears in the above—identified patent and that said Letters Patent is hereby corrected as shown below:

Column 2, line 45, "characteristics" should be --characteristic--

Column 5, line 63, "appendent" should be --appended--

Column 7, line 63, "section 2" should be --section 12--

Signed and Sealed this

Thirteenth Day of December 1983

[SEAL]

Attest:

GERALD J. MOSSINGHOFF

Attesting Officer

Commissioner of Patents and Trademarks